United States Patent [19]
Kato

[11] Patent Number: 4,984,663
[45] Date of Patent: Jan. 15, 1991

[54] TRANSFER APPARATUS FOR 4-WHEEL DRIVING

[75] Inventor: Tadahiko Kato, Kosai, Japan

[73] Assignee: Fuji Tekko Co., Ltd., Shizuoka, Japan

[21] Appl. No.: 478,497

[22] Filed: Feb. 12, 1990

[30] Foreign Application Priority Data

Mar. 7, 1989 [JP] Japan ................... 1-25704
Mar. 7, 1989 [JP] Japan ................... 1-25705
Apr. 5, 1989 [JP] Japan ................... 1-86627
Apr. 5, 1989 [JP] Japan ................... 1-86628

[51] Int. Cl.$^5$ ................................ F16D 43/28
[52] U.S. Cl. ................... 192/0.02 R; 192/103 F; 192/85 AA; 180/251
[58] Field of Search ........... 192/0.02 R, 0.33, 0.07, 192/0.076, 70.12, 83, 85 AA, 85 A, 85 L, 103 F; 180/251, 233; 74/665 GA, 665 GE; 475/136, 137

[56] References Cited

U.S. PATENT DOCUMENTS

4,576,061 3/1986 Yamakawa et al. ...... 74/665 GA X
4,895,236 1/1990 Sakakibara et al. .............. 192/84 R Primary Examiner—Rodney H. Bonck
Assistant Examiner—Andrea Pitts
Attorney, Agent, or Firm—Wenderoth, Lind & Ponack

[57] ABSTRACT

A rotational force which was input from a transmission is received by a main shaft and transferred to the rear wheel side. The rotational force of the main shaft is transferred to the front wheel side through a hydraulic clutch. The hydraulic clutch receives the supply of an operating hydraulic pressure from an oil pump which is driven by a DC motor. Further, an operating hydraulic pressure is supplied in parallel to the hydraulic clutch from a second oil pump which is driven by the main shaft. The DC motor is driven only in the low-speed mode, stop mode, and reverse mode. On the other hand, after the motor was turned on at a rotational speed of a predetermined rotational speed or less, if the speed does not reach a second rotational speed higher than the predetermined rotational speed, the motor is not turned off.

6 Claims, 11 Drawing Sheets

TRANSFER APPARATUS FOR 4-WHEEL DRIVING

BACKGROUND OF THE INVENTION

The present invention relates to a 4-wheel driving transfer apparatus having a wet multi-plate clutch mechanism which is hydraulically driven and, more particularly, to a 4-wheel driving transfer apparatus in which a clutch hydraulic pressure is generated by an electric oil pump.

Figure 1:
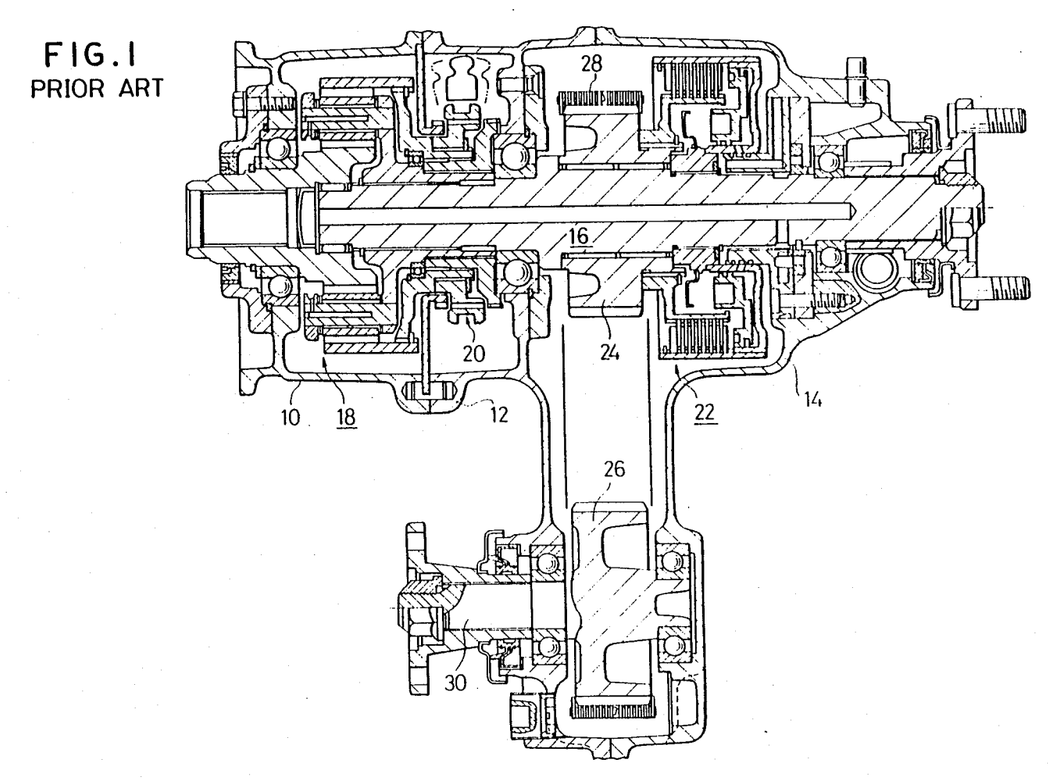
FIG. 1 is a cross sectional view showing a conventional example.

Hitherto, as a 4-wheel driving transfer apparatus which is used in combination with an automatic transmission, for instance, there has been known an apparatus as shown in FIG. 1.

In FIG. 1, reference numerals 10, 12, and 14 denote casings. A main shaft 16 is rotatably supported to the casings 12 and 14. Reference numeral 18 denotes a planetary gear mechanism and 20 indicates a switching mechanism for switching the planetary gear mechanism 18 to two stages of a high speed and a low speed. Reference numeral 22 indicates a hydraulic clutch mechanism which can absorb a differential rotation between the front wheels and the rear wheels and is hydraulically driven. Reference numeral 24 denotes a drive sprocket which is coupled to the hydraulic clutch mechanism 22. Reference numeral 26 represents a driven sprocket which is coupled to the drive sprocket 24 through a chain 28. Reference numeral 30 denotes a front drive shaft which is formed integrally with the driven sprocket 26.

A rotational force from the automatic transmission arranged in front of the transfer apparatus is switched to a low speed (deceleration) or a high speed (direct coupling) in accordance with the switching state of the planetary gear mechanism 18 which was selected by the switching mechanism 20 and is transferred to the main shaft 16 and, further, drives the rear wheels (not shown). On the other hand, in the 4-wheel driving state in which the hydraulic clutch mechanism 22 is hydraulically driven, the rotational force of the main shaft 16 is transferred to the drive sprocket 24 through the hydraulic clutch mechanism 22 and is transferred from the drive sprocket 24 to the front drive shaft 30 through the chain 28 and driven sprocket 26. Further, a rotational force of the front drive shaft 30 is transferred to the front wheels and the 4-wheel driving running state is obtained.

However, in such a conventional transfer apparatus, the hydraulic clutch mechanism 22 for variably changing a torque distribution of the front and rear wheels is used upon switching between the 2-wheel driving mode and the 4-wheel driving mode and upon 4-wheel driving. However, since the hydraulic clutch mechanism 22 always needs the hydraulic pressure, only a combination with the automatic transmission in which a line pressure is always obtained is satisfied.

That is, in a combination with a manual transmission, there is a problem such that even if an oil pump which receives the rotation of the transmission and generates a hydraulic pressure is provided, no hydraulic pressure is obtained when the vehicle stops, and the hydraulic pressure lacks in the low-speed running mode or the reverse mode, and the switching between the 2-wheel/4-wheel driving modes by the hydraulic clutch mechanism and the control to variably change the torque in the 4-wheel driving mode cannot be properly executed.

SUMMARY OF THE INVENTION

It is an object of the present invention to provide a 4-wheel driving transmission apparatus having a hydraulic clutch mechanism which can be also combined with a manual transmission.

Another object of the invention is to provide a transfer apparatus for use in a 4-wheel driving vehicle having an oil pump which always generates a clutch operating hydraulic pressure by the motor driving.

Still another object of the invention is to provide a 4-wheel driving transfer apparatus having a lubricating oil pump which is rotated by a main shaft in addition to an oil pump which is driven by a motor.

Still another object of the invention is to provide a 4-wheel driving transfer apparatus in which clutch operating hydraulic pressures are supplied in parallel by an oil pump which is driven by a main shaft and an oil pump which is driven by a DC motor.

Still another object of the invention is to provide a 4-wheel driving transfer apparatus for controlling so as to suppress an electric power consumption of a DC motor to drive an oil pump to a necessary minimum value.

Still another object of the invention is to provide a 4-wheel driving transfer apparatus in which a DC motor is driven only in a reverse mode of a vehicle, a stop mode, and a low-speed mode.

Still another object of the invention is to provide a 4-wheel driving transfer apparatus which prevents that a DC motor to drive an oil pump is frequently repetitively turned on and off in a low-speed running mode.

That is, the present invention intends to provide a 4-wheel driving transfer apparatus in which a rotational force of a main shaft which is rotatably supported to a casing is transferred from a sprocket to a front drive shaft through a hydraulic clutch mechanism.

Upon switching between the 2-wheel/4-wheel driving modes and upon 4-wheel driving mode, the hydraulic clutch mechanism can variably change a distribution of the torques to the front wheels by a hydraulic control. A control hydraulic pressure to the hydraulic clutch mechanism is generated by driving an oil pump which is externally attached to the bottom portion side of the casing by a DC motor. Thus, even when the main shaft is stopped, an always constant hydraulic pressure can be obtained by the transfer apparatus itself by driving the oil pump by the motor and there is no need to obtain a line pressure from the automatic transmission. Therefore, the transfer apparatus of the invention can be also combined with the manual transmission.

The present invention has a lubricating oil pump which is rotated by the main shaft in addition to an oil pump which is driven by a DC motor. By separately providing such a lubricating oil pump, there is no need to lubricate by using the oil pump which is driven by the motor, so that the motor and pump can be miniaturized.

On the other hand, according to the invention, hydraulic pressures are supplied in parallel to the hydraulic clutch mechanism from a first oil pump which is driven by a DC motor and from a second oil pump which is driven by a main shaft. At this time, if a 4WD switch is set to ON and a rotational speed of the main shaft is set to a predetermined value or less, the DC motor is turned on, and even if the rotational speed of the main shaft exceeds the predetermined value, when a reverse switch is set to ON, the DC motor is turned on.

On the other hand, the DC motor which was turned on when the rotational speed of the main shaft is set to a first predetermined value or less is turned off when the main shaft rotational speed is set to be equal to or larger than a second predetermined value higher than the first predetermined value.

The above and other objects, features, and advantages of the invention will become more apparent from the following detailed description with reference to the drawings.

DETAILED DESCRIPTION OF THE PREFERRED EMBODIMENTS

Figure 2:
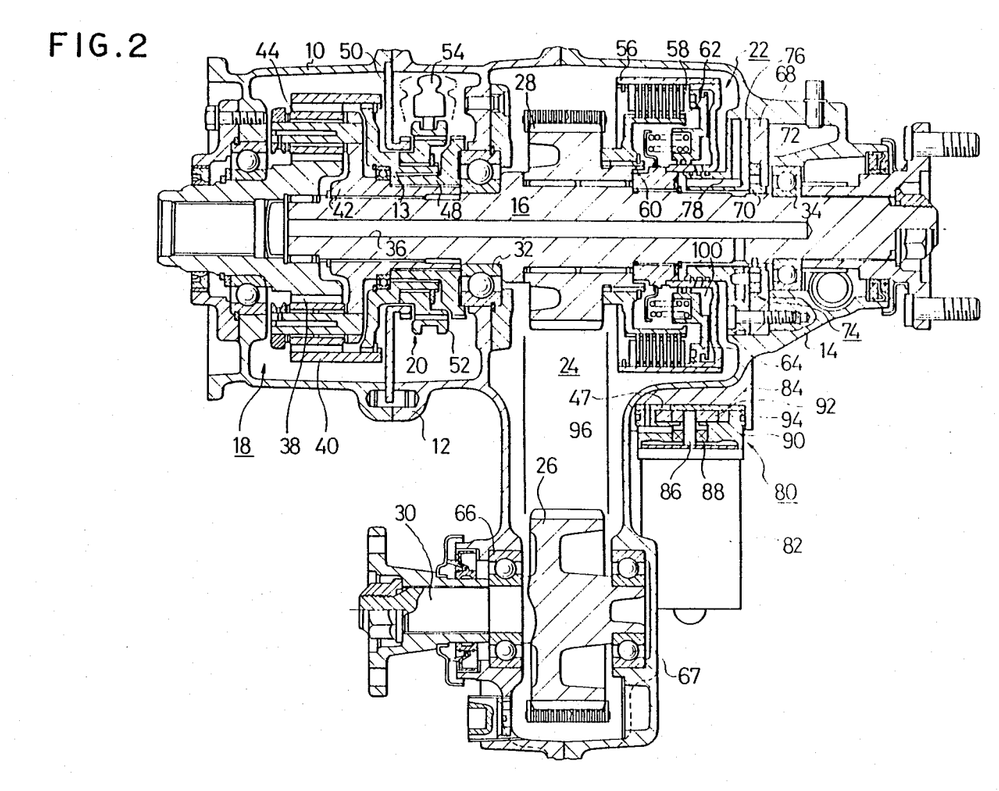
FIG. 2 is a cross sectional view showing an embodiment of the present invention.

FIG. 2 is a cross sectional view showing an embodiment of the present invention and shows a state when it is seen as a plan view.

In FIG. 2, reference numerals 10, 12, and 14 denote the casings which were divided into three parts. The main shaft 16 is rotatably supported into the casings 12 and 14 through bearings 32 and 34. An oil passage 36 to lubricate each lubricating portion is formed in the main shaft 16.

The planetary gear mechanism 18 is provided in the casing 10. The planetary gear mechanism 18 comprises: a sun gear 38 to receive a rotation input; a ring gear 40 arranged in the outermost periphery; a carrier casing 42 which rotates on the same axis as the gears 38 and 40; and a planetary gear 44 which is rotatably supported to the carrier casing 42.

Subsequent to the planetary gear mechanism 18, the switching mechanism 20 is provided. The switching mechanism 20 switches the planetary gear mechanism 18 to a low-speed mode (decelerating state) or a high-speed mode (direct coupling state).

The switching mechanism 20 comprises: a hub 46 which is rotatably supported to the carrier casing 42; a jaw gear 48 which is spline coupled with the carrier casing 42; a clutch gear 50 which is sandwiched and fixed between the casings 10 and 12; a coupling sleeve 52 which is come into engagement with the clutch gear 50 upon switching to the low-speed mode; and a fork 54 to move the coupling sleeve 52.

The hydraulic clutch mechanism 22 is provided in the casing 14 and executes the switching between the 2-wheel/4-wheel driving modes and the torque variable change control to the front wheels in the 4-wheel driving mode. The hydraulic clutch mechanism 22 comprises: a drum 56 which is spline coupled with the main shaft 16; a clutch plate 58 which is spline coupled with the inner periphery of the drum 56; a hub 60 which is spline coupled with the drive sprocket 24; a clutch plate 62 which is spline coupled with the hub 60; and a piston 64 to press the clutch plates 58 and 62.

The chain 28 is reeved between the drive sprocket 24 and the driven sprocket 26. The driven sprocket 26 is formed integrally with the front drive shaft 30. The front drive shaft 30 is rotatably supported to the casings 12 and 14 through bearings 66 and 67.

A lubricating oil pump 74 is provided behind the hydraulic clutch mechanism 22. The oil pump 74 is constructed in a manner such that an outer gear 72 is fixed into a pump housing 68 and an inner gear 70 fixed to the main shaft 16 is arranged on the inside of the outer gear 72. The oil pump 74 supplies a lubricating oil to the oil passage 36 by the rotation of the inner gear 70 by the main shaft 16.

An oil pump 80 and a DC motor 82 are externally attached through a boss portion 84 to the bottom portion side of the casing 14 in which the hydraulic clutch mechanism 22 is enclosed.

That is, a pump housing 90 having an outer gear is provided for the boss portion 84. A rotary shaft 86 of a DC motor 82 is located in the pump housing 90 through a cup seal 88, thereby fixing an inner gear 92. Reference numeral 94 denotes an O ring and 96 indicates a drain hole.

A hydraulic pressure which is fed with a pressure by an oil pump 80 due to the rotation of the inner gear 92 by the DC motor 82 is transferred from a discharge opening 98 through a valve unit to a passage 78 provided in a cover 76 of the lubricating oil pump 74 by a piping arranged on the outside of the casing 14. The hydraulic pressure is then supplied from the passage 78 to a piston liquid chamber 100 of the hydraulic clutch mechanism 22.

The operation will now be described.

When an engine of a vehicle is started by an ignition key, the DC motor 82 is driven and an oil is discharged from the discharge opening 98 of the oil pump 80. The discharge opening 98 of the oil pump 80 is connected to the passage 78 through the valve unit which is externally piped. When the valve unit is opened to set the vehicle into the 4-wheel driving mode, the hydraulic pressure from the oil pump 80 is supplied through the passage 78 to the piston liquid chamber 100. When the hydraulic pressure is supplied to the piston liquid chamber 100, the piston 64 is moved and presses the clutch plates 58 and 62 in the axial direction so as to be come into frictional contact with each other. The rotational force of the main shaft 16 is transferred to the front drive shaft 30 through the hydraulic clutch mechanism 22. Thus, the operating mode is switched to the 4-wheel driving mode. The torque distribution to the front wheels in the 4-wheel driving mode can be set to a proper torque distribution by changing a magnitude of the hydraulic pressure which is supplied from the oil pump 80 to the hydraulic pressure clutch mechanism 22 by the valve unit.

Figure 3:
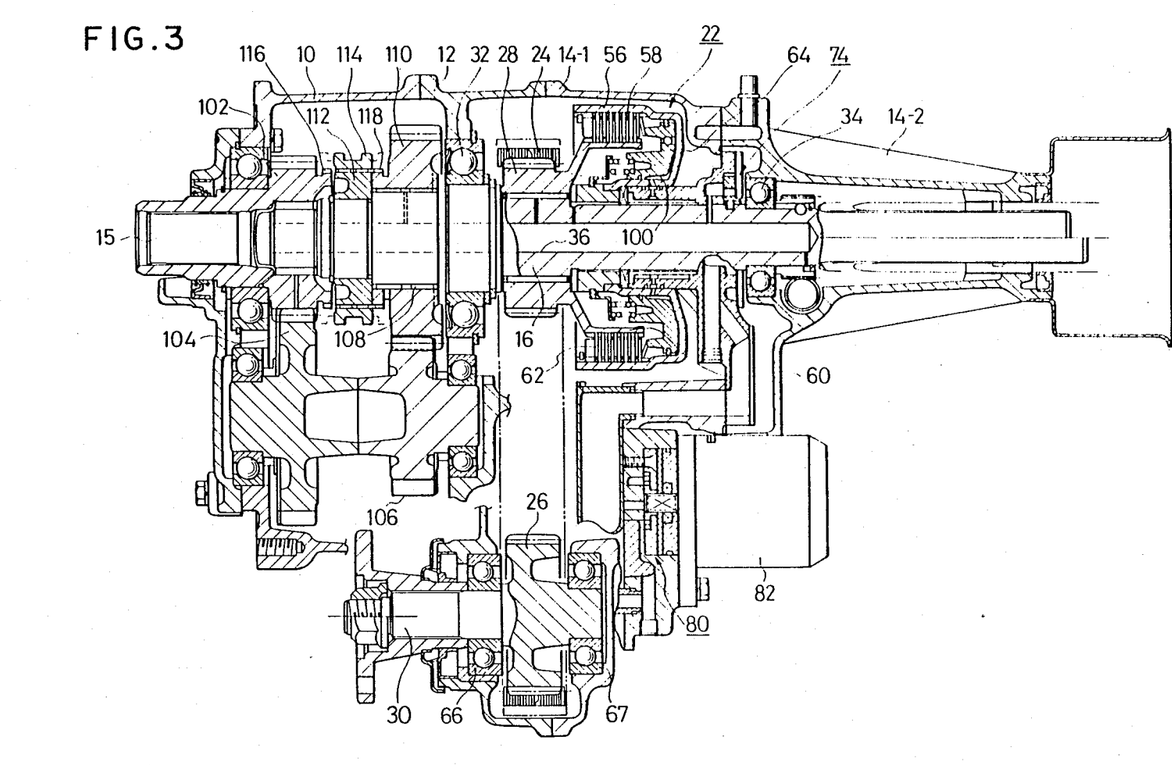
FIG. 3 is a cross sectional view showing another embodiment of the invention.

FIG. 3 is a cross sectional view showing another embodiment of the invention.

In FIG. 3, a main drive shaft 15 and the main shaft 16 are coaxially arranged in the casings 10, 12, 14-1, and 14-2 and are rotatably supported by bearings, respectively. A main drive gea 102 which is come into engagement with a counter drive gear 104 is formed integrally with the main drive shaft 15. A counter gear 106 which is formed coaxially with the counter drive gear 104 is in engagement with a low-speed gear 110 which is relatively rotatably attached to the main shaft 16 through a needle bearing 108. A switching mechanism comprising a hub 112, a coupling sleeve 114, and clutch gears 116 and 118 is provided between the main drive gear 102 and the low-speed gear 110. When the coupling sleeve 114 is come into engagement with the clutch gear 116 by a shifting operation, the main drive shaft 15 is directly coupled with the main shaft 16, so that in the operating mode is switched to the high-speed mode. On the other hand, when the coupling sleeve 114 is come into engagement with the clutch gear 118 by the shifting operation, the rotational force of the main drive shaft 15 is decelerated and transferred to the main shaft 16 through the main drive gear 102, counter drive gear 104, counter gear 106, and low-speed gear 110, so that the operating mode is switched to the low-speed mode.

The above mechanism is provided in place of the planetary gear mechanism 18 and switching mechanism 20 in FIG. 2. The hydraulic clutch mechanism 22 other than the above mechanism, the first oil pump 80 which is driven by the DC motor 82, the lubricating second oil pump 74 which is driven by the main shaft 16, and a power transfer mechanism to the front drive shaft 30 are fundamentally similar to those in the embodiment of FIG. 2.

The embodiment of FIG. 3 differs from the embodiment of FIG. 2 with respect to a point that the oil pump 74 which is driven by the main shaft 16 supplies the lubricating oil to the oil passage 36 and, at the same time, it also supplies an operating oil pressure to the hydraulic clutch mechanism 22.

Although the oil pump 80 which is driven by the DC motor 82 is arranged at the position of the casing 14-1 different from that in FIG. 2, any other constructional difference does not exist.

Figure 4:
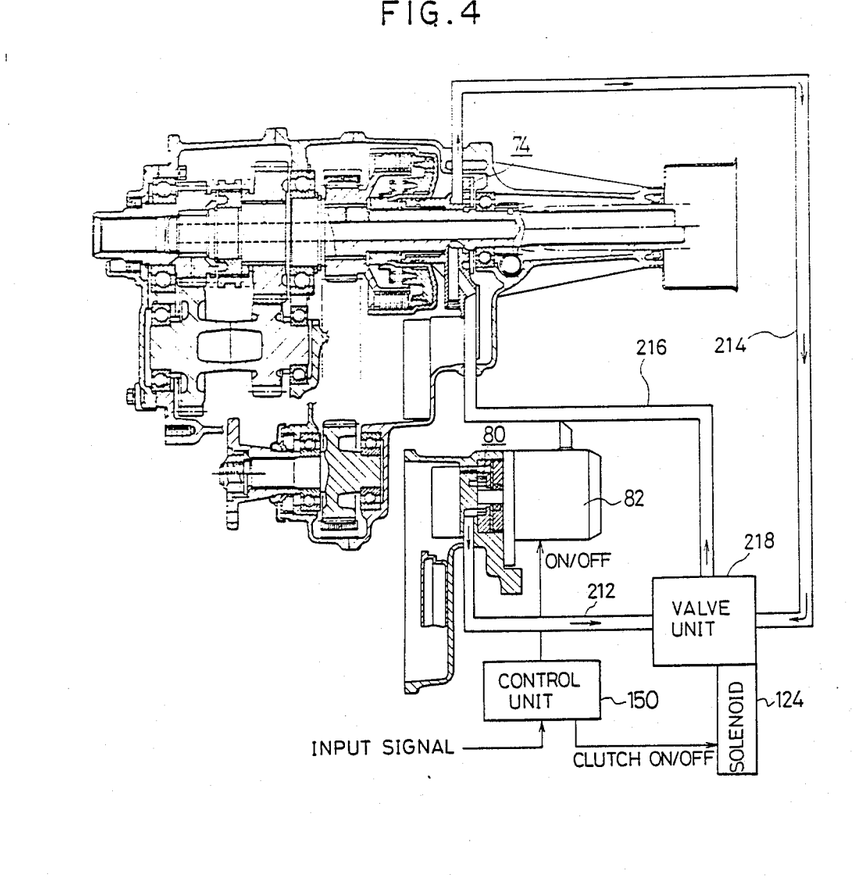
FIG. 4 is an explanatory diagram of a hydraulic circuit in FIG. 3.

As shown in a hydraulic circuit of FIG. 4, the discharge pressures from the oil pump 80 which is driven by the DC motor 82 and the oil pump 74 which is driven by the main shaft 16 are supplied to a valve unit 218 through oil passages 214 and 216, respectively.

Figure 5:
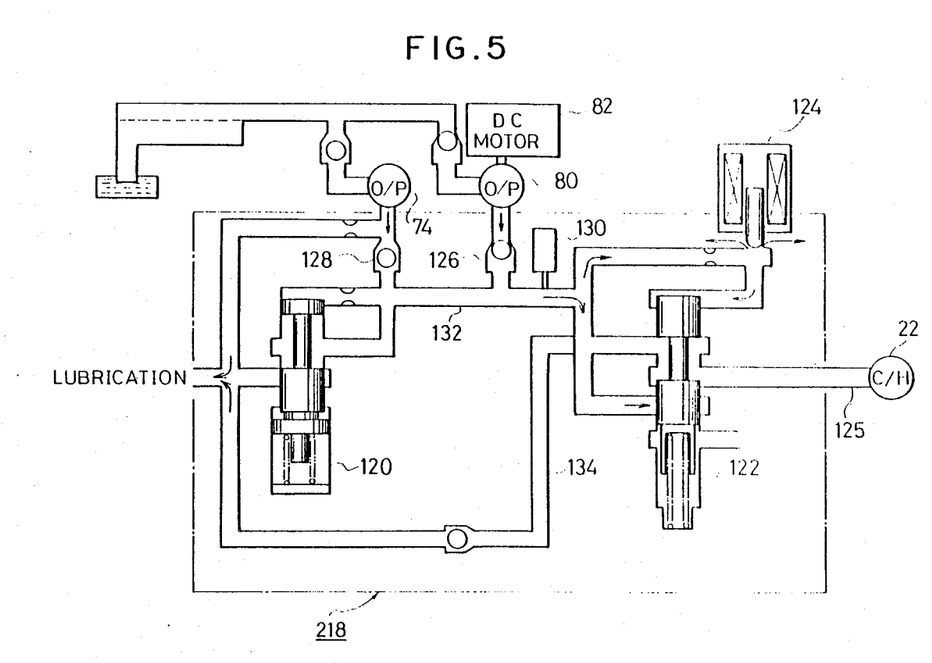
FIG. 5 is a a constructional diagram of a valve unit in FIG. 4.

The valve unit 218 has a construction as shown in FIG. 5.

In FIG. 5, a discharge line of the oil pump 80 and a discharge line of the oil pump 74 are commonly connected to a line 132 through check valves 126 and 128. A solenoid valve 124 to control an accumulator 130, a regular valve 120, a shift valve 122, and a pilot hydraulic pressure of the shift valve 122 is provided for the line 132. The regulator valve 120 keeps the hydraulic pressure of the line 132 to a predetermined value, for instance, 8.75 kgf/cm². The pilot hydraulic pressure of the shift valve 122 is set to 0 in a drain state due to the turn-on of the solenoid valve 124 shown in the diagram and the spool is switched as shown in the diagram, thereby communicating the hydraulic clutch mechanism 22 with a tank line 134. When the current supply to the solenoid valve 124 is shut off and the drain state of the line 132 is stopped in association with the switching operation to the 4-wheel driving mode, the pilot hydraulic pressure is generated and the spool is downwardly pressed and the line 132 is communicated with the hydraulic clutch mechanism 22, thereby supplying an operating hydraulic pressure. By duty controlling the solenoid valve 124, the pilot hydraulic pressure can be variably changed. Thus, the spool of the shift valve 122 is controlled to an arbitrary position, the operating hydraulic pressure to the hydraulic clutch mechanism 22 is variably changed, and the torque distribution to the front wheels can be adjusted.

Referring again to FIG. 4, the solenoid valve 124 and DC motor 82 provided for the valve unit 218 are controlled by a control unit 150. A 4WD switch signal, a signal of a reverse shift detection switch, and a rotational speed detection signal of the main shaft 16 are input to the control unit 150. Then, the control unit 150 controls the on/off operations of the DC motor 80 in accordance with an operating flow shown in FIG. 6.

The control of the control unit 150 will now be described with reference to FIG. 6. First, the reverse switch signal, rotational speed signal of the main shaft, and 4WD switch signal are input in step S1.

In the next step S2, a check is made to see if the 4WD switch signal is set to ON or not. If it is not ON, that is, if the operating mode has been set into the 2WD mode, step S3 follows. If the DC motor 82 has been set to ON in step S3, it is turned off. If the 4WD signal is set to ON, step S4 follows and a check is made to see if a rotational speed N of the main shaft 16 is set to, for instance, 800 r.p.m. or less or not as an engine rotational speed. If it is 800 r.p.m. or less, the DC motor 82 is turned on in step S5. If the rotational speed N exceeds 800 r.p.m., a check is made in step S6 to see if the reverse switch has been set to ON or not. If it is ON, step S5 follows and the DC motor 82 is turned on. When the reverse switch is OFF, if the DC motor 82 has already been set to ON in step S3, it is turned off.

That is, the control unit 150 turns on the DC motor 82 in the following shifting states.

(1) Stop—4WD
(2) Low speed—forward advance—4WD
(3) Reverse—4WD

Figure 7:
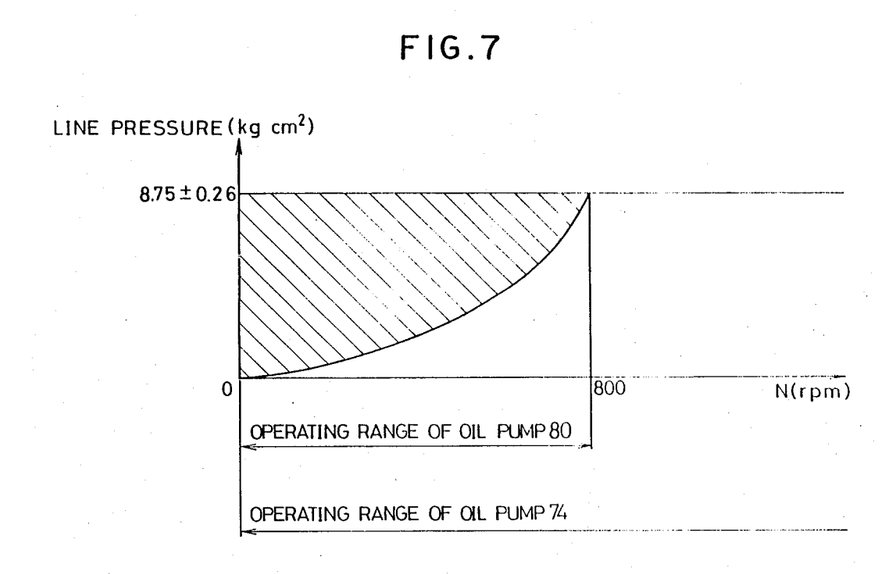
FIG. 7 is an explanatory diagram showing operating ranges of two oil pumps.

FIG. 7 shows characteristics of the oil pumps 80 and 74 to the rotational speed of the main shaft 16. A pressure lack portion shown by a hatched region in the low-speed mode of the oil pump 74 which is driven by the main shaft 16 is supplemented by the oil pump 80 which is driven by the DC motor 82, so that the line hydraulic pressure which is necessary for the operation of the hydraulic clutch mechanism 22 can be always assured.

On the other hand, the full electric power consumption of a battery of a vehicle can be prevented without needing to continuously operate the DC motor 82.

Figure 6:
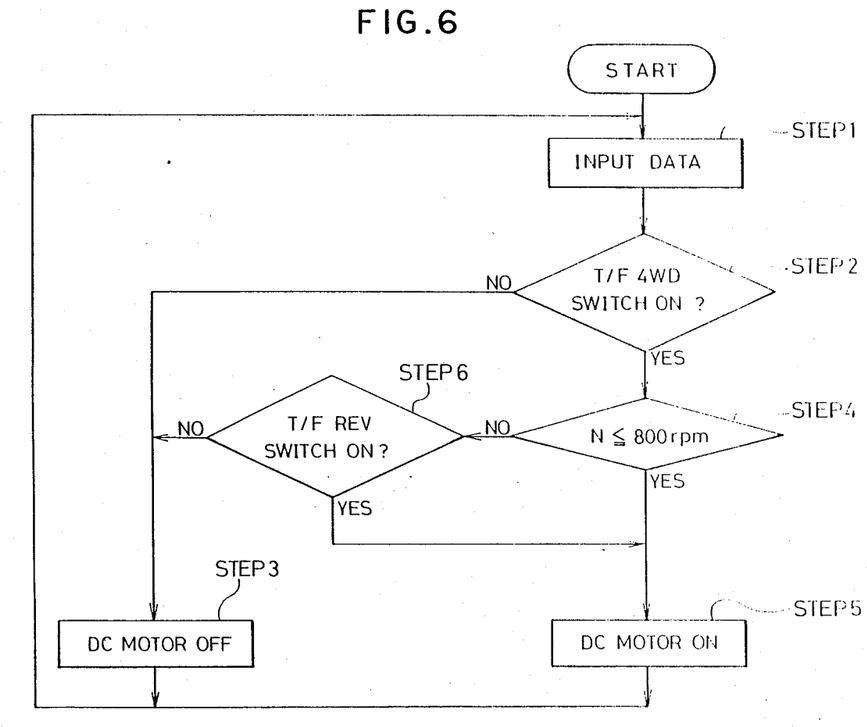
FIG. 6 is a flowchart showing the operation of a control unit in FIG. 4.
Figure 8:
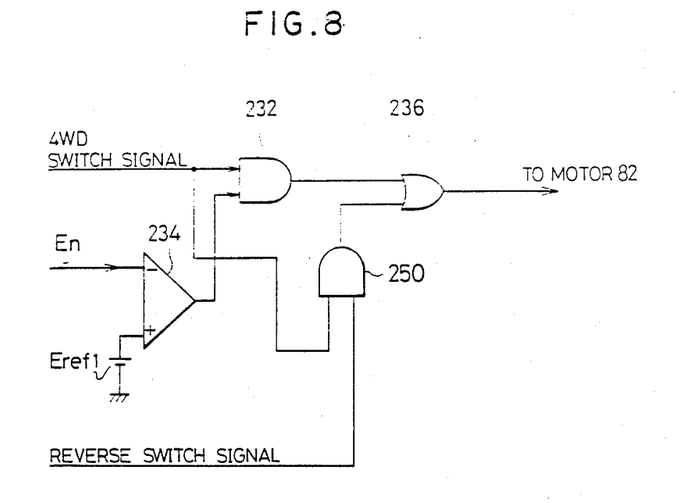
FIG. 8 is a circuit constructional diagram of the control unit in FIG. 4.

FIG. 8 shows a circuit construction of the control unit 150 to realize the control according to FIG. 6.

In FIG. 8, a signal which is set to H (high level) by the turn-on of the 4WD switch signal is input to an AND gate 232. A comparator 234 compares a rotational speed signal $E_n$ of the main shaft 16 with a specified value $E_{ref1}$. When the En is equal to or lower than $E_{ref1}$, the comparator 234 gives an H output signal to the AND gate 232. Therefore, when the 4WD switch signal is ON and the rotational speed signal is set to the specified value or less, the AND gate 232 outputs an H signal to turn on the DC motor 82 through an OR gate 236. On the other hand, a signal which is set to H by the turn-on of the reverse detection switch and a 4WD switch signal which is turned on in the 4WD mode are input to an AND gate 250. When the 4WD switch signal is ON and the reverse shift is detected, an H signal to turn on the motor is output from the AND gate 250 through the OR gate 236. In place of the circuit of FIG. 8, the control unit 150 can be also controlled by a program by a CPU.

Figure 9:
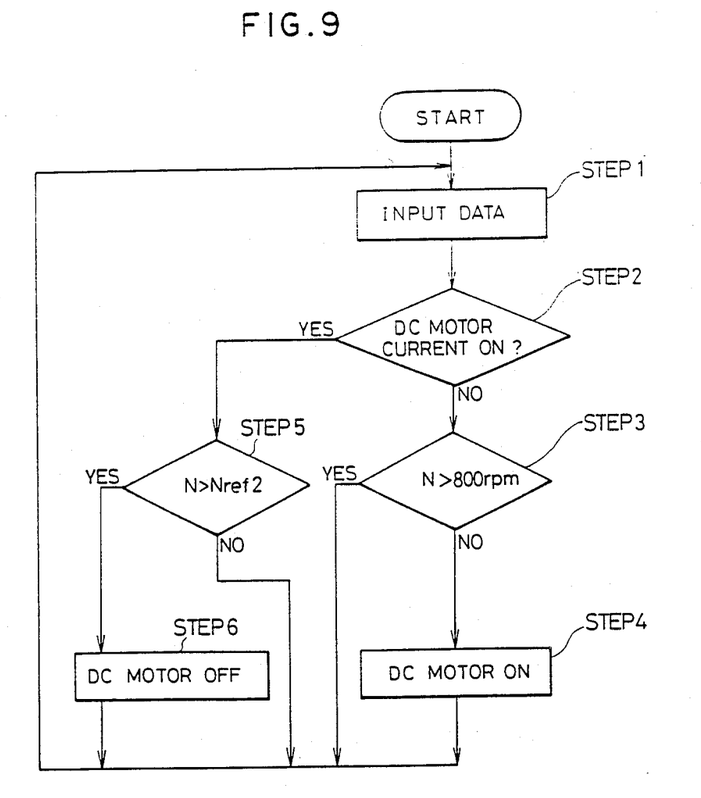
FIG. 9 is a flowchart showing another control operation by the control unit in FIG. 4.

FIG. 9 is a flowchart showing another control of the DC motor 82 by the control unit 150 in FIG. 4 and shows the control after the DC motor 82 was turned on after completion of the processes in steps S2, S4, and S5 in FIG. 6.

In FIG. 9, a motor current signal and a main shaft rotational speed signal are input in step S1. In step S2, a check is made to see if the DC motor 82 has been turned on or not on the basis of the motor current signal.

When the DC motor 82 is off, in step S3, a check is made to see if the main shaft rotational speed N exceeds 800 r.p.m. or not. If YES, the processing routine is returned to step S1. If it is set to 800 r.p.m. or less, the DC motor 82 is turned on in step S4.

On the other hand, if the DC motor 82 has been turned on in step S2, a check is made in step S5 to see if the main shaft rotational speed N exceeds a special value $N_{ref2}$ in a rotational speed range, for instance, from 900 to 1300 r.p.m. in which the main shaft rotational speed N is higher than 800 r.p.m. by 100 r.p.m. or more or not.

When $N \leq N_{ref2}$ the processing routine is returned to step S1.

When $N > N_{ref2}$ the DC motor 82 is turned off in step S6.

Figure 10:
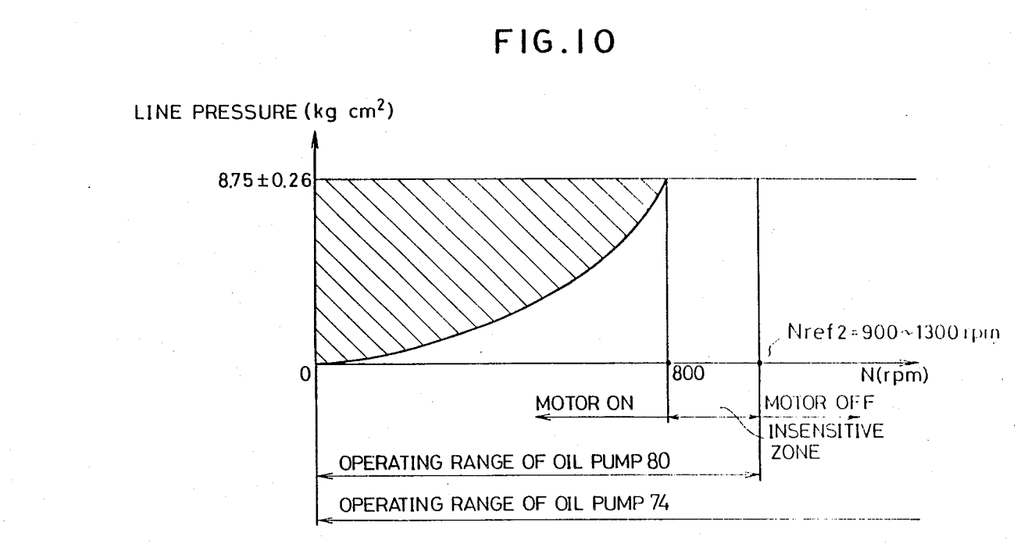
FIG. 10 is an explanatory diagram showing the on/off control of a DC motor by the control of FIG. 9.

FIG. 10 shows an operating range of the oil pump 80 which is driven by the DC motor 82 due to the processes in FIG. 9 together with that of the oil pump 74 which is driven by the main shaft 16. As will be obvious from the comparison with FIG. 7, the motor is turned on when the rotational speed is 800 r.p.m. or less and the motor is turned off when the rotational speed exceeds the specified value $N_{ref2}$, for instance, $N_{ref2} = 1200$ r.p.m. in a range from 900 to 1300 r.p.m. in which an insensitive zone is provided.

Figure 11:
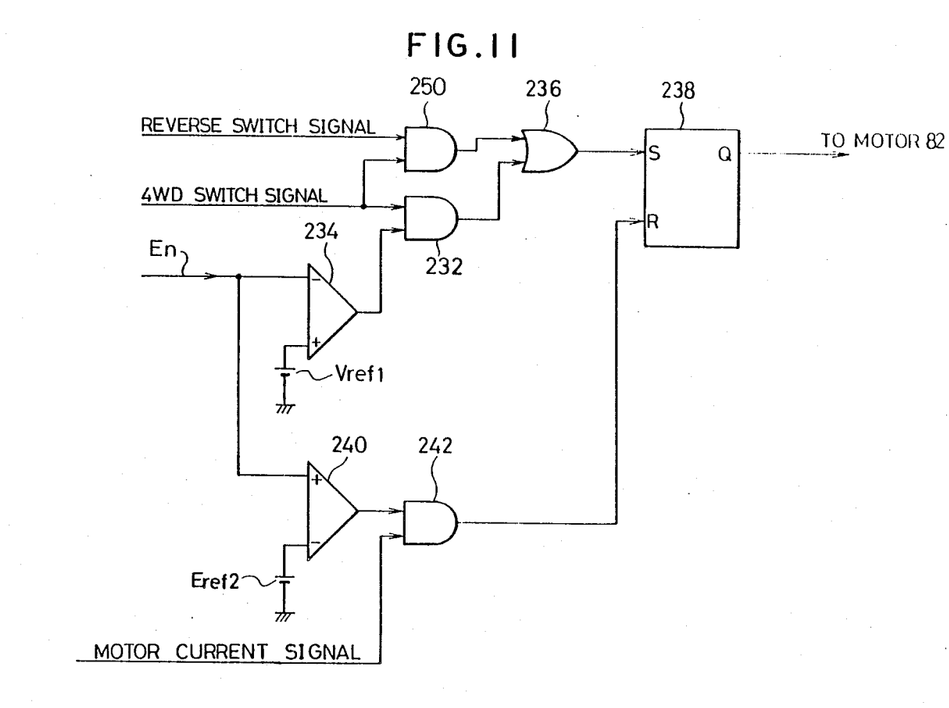
FIG. 11 is a circuit diagram of a control unit to execute the processes in FIG. 9.

FIG. 11 shows a diagram in which the processing function of FIG. 9 is added to the control unit circuit in FIG. 8. An flip-flop (FF) 238, a comparator 240 in which the reference value $E_{ref2}$ is set, and an AND gate 242 to which the motor current detection signal is input are newly provided.

That is, the FF 238 is set by the turn-on of the motor and an H level output is generated. In this state, when the rotational speed signal $E_n$ exceeds the reference value $E_{ref2}$, the comparator 240 outputs an H level signal and the motor current detection signal is set to the H level. Thus, the FF 238 is reset by the H output signal of the AND gate 242 and the DC motor 82 is turned off.

The program control by the CPU can be also executed in place of the circuit of FIG. 11.

As mentioned above, the motor is not turned off if the rotational speed does not exceed the second predetermined value which has been set by providing a predetermined insensitive zone to a higher rotational speed range for the rotational speed at which the DC motor 82 was turned on. Therefore, even when the vehicle is allowed to run at a constant velocity near the rotational speed at which the motor is turned on, the repetitive on/off operations of the DC motor do not occur and the life of the motor can be improved.

What is claimed is:

1. A transfer apparatus for 4-wheel driving, comprising:
   a main shaft to transfer a rotational force which was input from a transmission to a rear wheel side;
   hydraulic clutch means for transferring a motive power rotation of the main shaft to a front wheel side;
   pump means which is externally attached to a bottom portion side of a casing and generates an operating hydraulic pressure of the hydraulic clutch means; and
   DC motor means for rotating the pump means.

2. An apparatus according to claim 1, further comprising a second oil pump which is rotated by the main shaft and feeds a lubricating liquid.

3. A transfer apparatus for 4-wheel driving, comprising:
   a main shaft to transfer a rotational force which was input from a transmission to a rear wheel side;
   hydraulic clutch means for transferring a rotational force of the main shaft to a front wheel side;
   first pump means which is externally attached to an outside of a casing and generates an operating hydraulic pressure of the hydraulic clutch means;
   DC motor means for rotating the first oil pump;
   second pump means which is rotated by the main shaft and generates an operating hydraulic pressure of the hydraulic clutch means;
   valve means for supplying the operating hydraulic pressures generated by the first and second pump means to the hydraulic clutch means upon switching to a 4-wheel driving mode and for stopping the supply of the operating hydraulic pressures upon switching to a 2-wheel driving mode; and
   motor control means for on/off controlling the DC motor means.

4. An apparatus according to claim 3, wherein said motor control means turns on the DC motor means if a rotational speed of the main shaft is set to a predetermined value o less when the switching to the 4-wheel driving mode was detected, and even if the rotational speed of the main shaft exceeds the predetermined value, when a switching operation to a reverse mode was detected, the motor control means turns on the DC motor means.

5. An apparatus according to claim 4, wherein said motor control means turns on the DC motor means at a rotational speed of the main shaft when an engine rotational speed is set to 800 r.p.m. or less.

6. An apparatus according to claim 3, wherein said motor control means comprises:
   motor drive means for turning on the DC motor means if the rotational speed of the main shaft is set to a first predetermined value or less when the switching to the 4-wheel driving mode was detected; and
   motor stop means for turning off the DC motor means when the rotational speed of the main shaft is set to be equal to or larger than a second predetermined value which is larger than the first predetermined value after the DC motor means was driven by the motor drive means.

* * * * *